(No Model.)

G. SOMMER.
CUTTER HEAD.

No. 269,733.

Patented Dec. 26, 1882.

Attest:
Howell Bartle
Edmond Brodhag

Inventor:
pro Gottlieb Sommer
Johnson and Johnson
Attys

UNITED STATES PATENT OFFICE.

GOTTLIEB SOMMER, OF WILLIAMSPORT, PENNSYLVANIA.

CUTTER-HEAD.

SPECIFICATION forming part of Letters Patent No. 269,733, dated December 26, 1882.

Application filed September 26, 1882. (No model.)

*To all whom it may concern:*

Be it known that I, GOTTLIEB SOMMER, a citizen of the United States, residing at Williamsport, county of Lycoming, and State of Pennsylvania, have invented new and useful Improvements in Cutter-Heads for Molding-Machines, of which the following is a specification.

My invention relates to improvements in reversible cutters for edge-molding, in which the cutters are adapted to be clamped between grooved collars upon a vertical spindle or arbor, and revolving above the table, with a guide for the edge of the material to work against, and constituting a reversible cutter-head.

My improved cutter is produced with straight sides extending from edge to edge—that is, its inner and outer faces are straight between the cutting-edges, but formed crosswise to correspond with the form of its cutting-edges, the cutter having in fact a double bend along its length between its straight upper and lower edges, giving it great strength and durability. This form gives the advantage of allowing it to be made of greater length between its cutting-edges, and to be sharpened as it wears without rendering it liable to be broken, as results from a flat plate. My cutter is braced by its form at every point against the resistance of its cutting action, giving it great stiffness along its cutting-edges to withstand cutting through knots and very hard wood. This is the important matter of my improvement, for edge-molding cutters hitherto made cannot withstand rough and heavy work, and the loss in cutters by breaking is very considerable in reversible edge-shaping machines.

Panel-sinking cutters have been produced from blanks by swaging with dies, so as to give the outer faces of cutter-wings the form of the molding, and necessarily a form corresponding with the cutting-edge and approximating a cone, adapted for panel or sunken-surface molding; but my cutter, while having its inner and outer faces corresponding with the molding and its cutting-edge, is of a construction suited only for producing edge moldings which do not require the face of the cutter to have the outline or form of the molding.

Figure 1:
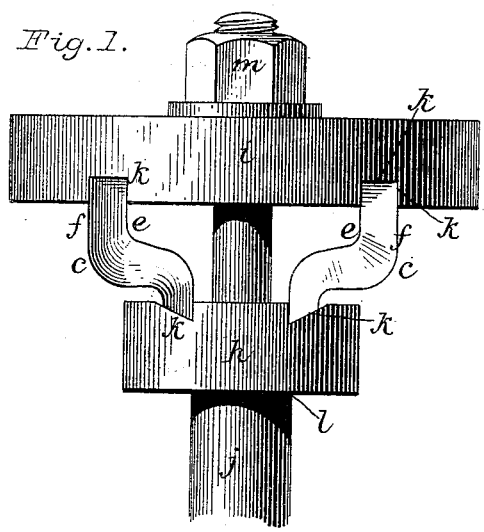
Figure 3:
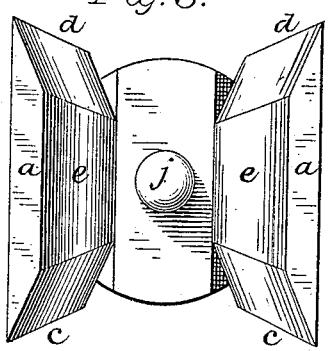
Figure 2:
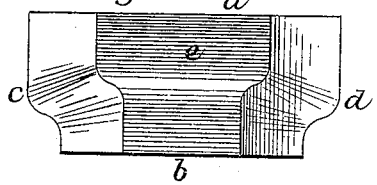
Figure 4:
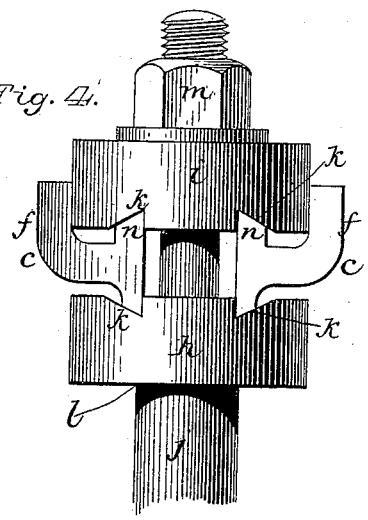
Figure 5:
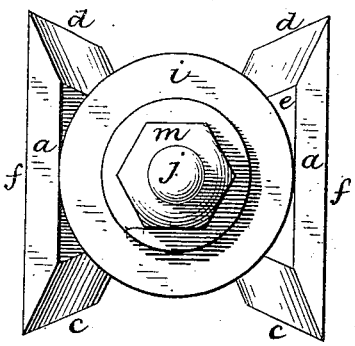
Figure 6:
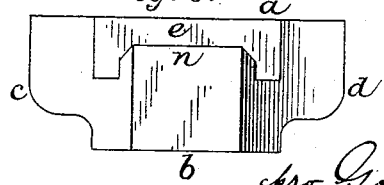

Referring to the accompanying drawings, Figure 1 represents a side elevation of a reversible cutter-head with my improved cutters; Fig. 2, an inner face view of the cutter; Fig. 3, a top view of the cutter-head with the upper clamping-collar removed; Fig. 4, a side elevation, showing a modified form of my cutter; Fig. 5, a top view of the same with the upper clamping-collar in place, and Fig. 6 the modified form of the cutter.

The cutters may be produced from sheet-metal blanks swaged into form by dies, or from prepared forgings. Each cutter is formed with an upper and a lower straight edge, *a b*, and two cutting-edges, *c d*, of a form of the molding to be produced. The body of the cutter between its upper and lower straight edges is formed crosswise to correspond with its cutting-edges, leaving the inner and outer faces, *e f*, of the cutter straight from one cutting-edge to the other, thus producing a cutter with both sides straight and parallel, but formed crosswise to correspond with the cutting-edges, to give it greater strength and durability. This form of cutter allows it to be made much longer than would be possible to use a flat double-edge cutter, and allows it to be sharpened until it becomes quite short, thereby allowing it to be used a longer time and with greater safety from accident than with a flat short cutter such as now used for edge-molding. In this form of double-edge cutter the lower straight edge, *b*, is shorter than the upper straight edge, *a*, and when the cutters are secured to the collars their upper straight parts, *a a*, stand vertical, or nearly so, and the distance between them is much greater than the distance between the lower edges, *b b*, which also for a short distance stand vertical, the intermediate space across the outer face, *f*, of the cutter being curved the exact shape of the cutting-edges, which in the example shown is that of a cyma reversa; but it may be of any other form suited for edge molding. While the outer face of the cutter has such crosswise form, its inner face, *e*, need not necessarily be of such form, but may be of straight flat faces, as the inner face does not join the cutting-edges, but joins the bevel which forms the cutting-edge.

The collars *h i* may be secured upon the spindle *j* in any suitable way, and they are provided with face grooves *k* to receive the upper and lower edges of the cutters and hold them in place. The lower collar, h, is seated upon a shoulder, l, of the spindle, and the upper collar, i, is clamped upon the cutters by a nut, m, screwed upon the upper end of the spindle. The clamping action of these collars will be sufficient to hold the cutters in place; but the collars may be secured upon the spindle by a keyway, so that they cannot turn thereon, and I may use the ordinary grooved cross-heads instead of the collars.

Instead of securing the cutters by the clamping action of the upper collar upon their upper edges, as shown in Fig. 1, they may be secured by vertical ribs n, rising from their inner faces at a point over the lower edge of the cutter, as in Fig. 4. In this plan the upper collar will rest low down between the upper parts of the cutters, having the greatest distance between their inner faces, so that I may use collars of equal or unequal diameters or cross-heads of equal or unequal length, the form of the cutters in each case being identical.

The holding-edges of the cutters may be beveled and their receiving-grooves V-shaped or of any other suitable form.

When the cutters are held in place by the inner ribs, n, the inner faces or walls of the cutters must be flat or right-angled, to allow the upper collar to be seated upon the cutters below their upper edges and between their inner faces; but I prefer clamping the cutters upon their upper edges, as giving a better clearing-space for the chips between the cutters. The cutters are set in vertical positions, and are adapted to operate when the spindle is revolved in either direction, the cutting-edge of each cutter revolving backward, having the proper clearance, as in reversible cutters.

The inner holding-rib may be formed with the cutter or attached thereto, and when so attached the cutter may be swaged into form by dies, the cutting-edges being produced by beveling their ends from the inside outward in the usual manner of reversible cutters.

Although the cutting-edges have the form of the molding to be produced and the body of the cutter has the form of its cutting-edges, yet when viewed as in Figs. 3 and 4 the cutting-edges appear straight.

I claim—

1. The combination of the grooved clamping-collars of a reversible rotary cutter-head with an edge-molding cutter having double cutting-edges, straight inner and outer surfaces extending from one cutting-edge to the other, and having a form in the direction crosswise of its length of the outline of the cutting-edges, substantially as described, for the purpose specified.

2. The double-edge molding-cutters having each straight inner and outer surfaces, $e f$, extending from one cutting-edge, $d$, to the other, $c$, formed crosswise to correspond with the outline of said cutting-edges, and having a holding-rib, n, on the upper part of its inner surface, in combination with the grooved clamping-collars $h i$, the upper one, $i$, of which being adapted to be clamped upon the ribs $n$ of each cutter between the inner surfaces of their upper straight parts, as described, shown, and for the purpose specified.

3. The edge-molding cutter having double cutting-edges, straight inner and outer surfaces extending from one cutting-edge to the other, and having a form in the direction crosswise of its length of the outline of the cutting-edges, as an improved article of manufacture.

In testimony whereof I have hereunto set my hand in the prssence of two subscribing witnesses.

GOTTLIEB SOMMER.

Witnesses:
A. E. H. JOHNSON,
EDMOND BRODHAG.